(12) United States Patent
Wenstrand et al.

(10) Patent No.: US 8,081,159 B2
(45) Date of Patent: Dec. 20, 2011

(54) PROGRAMMABLE LIFT RESPONSE FOR AN OPTICAL NAVIGATION DEVICE

(75) Inventors: John S. Wenstrand, Menlo Park, CA (US); Roopinder S. Grewal, San Jose, CA (US); Vincent C. Moyer, Milpitas, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 1313 days.

(21) Appl. No.: 11/065,530

(22) Filed: Feb. 24, 2005

(65) Prior Publication Data
US 2006/0187208 A1 Aug. 24, 2006

(51) Int. Cl.
*G09G 5/00* (2006.01)
(52) U.S. Cl. ........................................... 345/158
(58) Field of Classification Search .......... 345/163, 345/166, 158, 167; 341/31; 250/221; 362/365
See application file for complete search history.

(56) References Cited

U.S. PATENT DOCUMENTS

| | | | |
|---|---|---|---|
| 5,764,220 A | 6/1998 | Yoshizawa | |
| 6,078,312 A | 6/2000 | Liebenow | |
| 6,281,882 B1 | 8/2001 | Gordon et al. | |
| 6,304,249 B1 | 10/2001 | Derocher et al. | |
| 6,433,780 B1 | 8/2002 | Gordon et al. | |
| 7,233,319 B2 * | 6/2007 | Johnson et al. | 345/166 |
| 7,312,789 B2 * | 12/2007 | Koike et al. | 345/163 |
| 2002/0093486 A1 | 7/2002 | Gordon et al. | |
| 2002/0190953 A1 | 12/2002 | Gordon et al. | |
| 2004/0135825 A1 | 7/2004 | Brosnan | |
| 2004/0212587 A1 | 10/2004 | Kong | |
| 2005/0156875 A1 | 7/2005 | Kong | |
| 2005/0264531 A1 | 12/2005 | Tai et al. | |
| 2006/0007151 A1 * | 1/2006 | Ram | 345/163 |
| 2006/0086712 A1 * | 4/2006 | Feldmeier | 219/250 |

FOREIGN PATENT DOCUMENTS

| | | |
|---|---|---|
| GB | 2270557 A | 3/1994 |
| JP | 2002-244805 | 8/2002 |

* cited by examiner

*Primary Examiner* — Abbas Abdulselam (57) ABSTRACT

An optical pointing device comprising an optical navigation sensor and an adjustment module for adjusting an operational height of the optical navigation sensor is provided in one embodiment. In another embodiment, an optical pointing device comprising a housing and an optical navigation sensor contained in the housing is provided where the optical navigation sensor is configured to provide movement information to a processing system to cause a pointer to continue moving in response to detecting that the housing has been lifted from a navigation surface.

24 Claims, 6 Drawing Sheets

PROGRAMMABLE LIFT RESPONSE FOR AN OPTICAL NAVIGATION DEVICE

BACKGROUND

The use of a hand operated pointing device for use with a computer and its display has become almost universal. One form of the various types of pointing devices is the conventional (mechanical) mouse, used in conjunction with a cooperating mouse pad. Mechanical mice typically include a rubber-surfaced steel ball that rolls over the mouse pad as the mouse is moved. Interior to the mouse are rollers, or wheels, that contact the ball at its equator and convert its rotation into electrical signals representing orthogonal components of mouse motion. These electrical signals are coupled to a computer, where software responds to the signals to change by a $\Delta X$ and a $\Delta Y$ the displayed position of a pointer (cursor) in accordance with movement of the mouse.

In addition to mechanical types of pointing devices, such as a conventional mechanical mouse, optical pointing devices have also been developed. In one form of an optical pointing device, rather than using a moving mechanical element like a ball, relative movement between an imaging surface, such as a finger or a desktop, and photo detectors within the optical pointing device, is optically sensed and converted into movement information.

It would be desirable to be able to allow a user to customize the operation of an optical pointing device.

SUMMARY

One form of the present invention provides an optical pointing device comprising an optical navigation sensor and an adjustment module for adjusting an operational height of the optical navigation sensor.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

Figure 1:
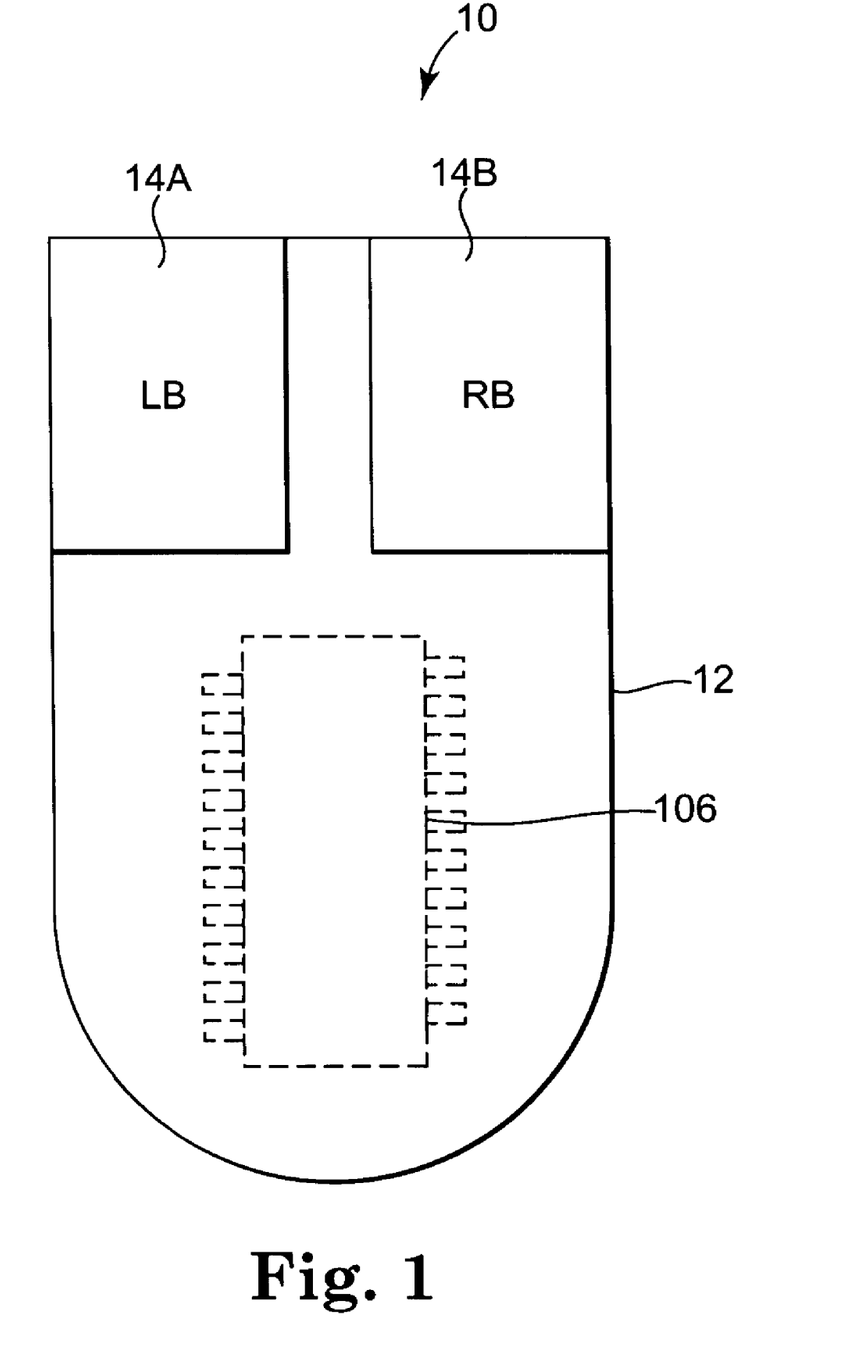
FIG. 1 is a top view of an optical pointing device according to one embodiment of the present invention.

FIG. 1 is a top view of an optical pointing device 10 according to one embodiment of the present invention. In the illustrated embodiment, optical pointing device 10 is an optical mouse. Pointing device 10 includes a plastic case 12, a left button (LB) 14A, a right button (RB) 14B, and an optical navigation sensor 106. Optical navigation sensor 106 is covered by plastic case 12, and is therefore shown with dashed lines in FIG. 1. Pointing device 10 according to one form of the invention is described in further detail below with reference to FIG. 2.

Figure 2:
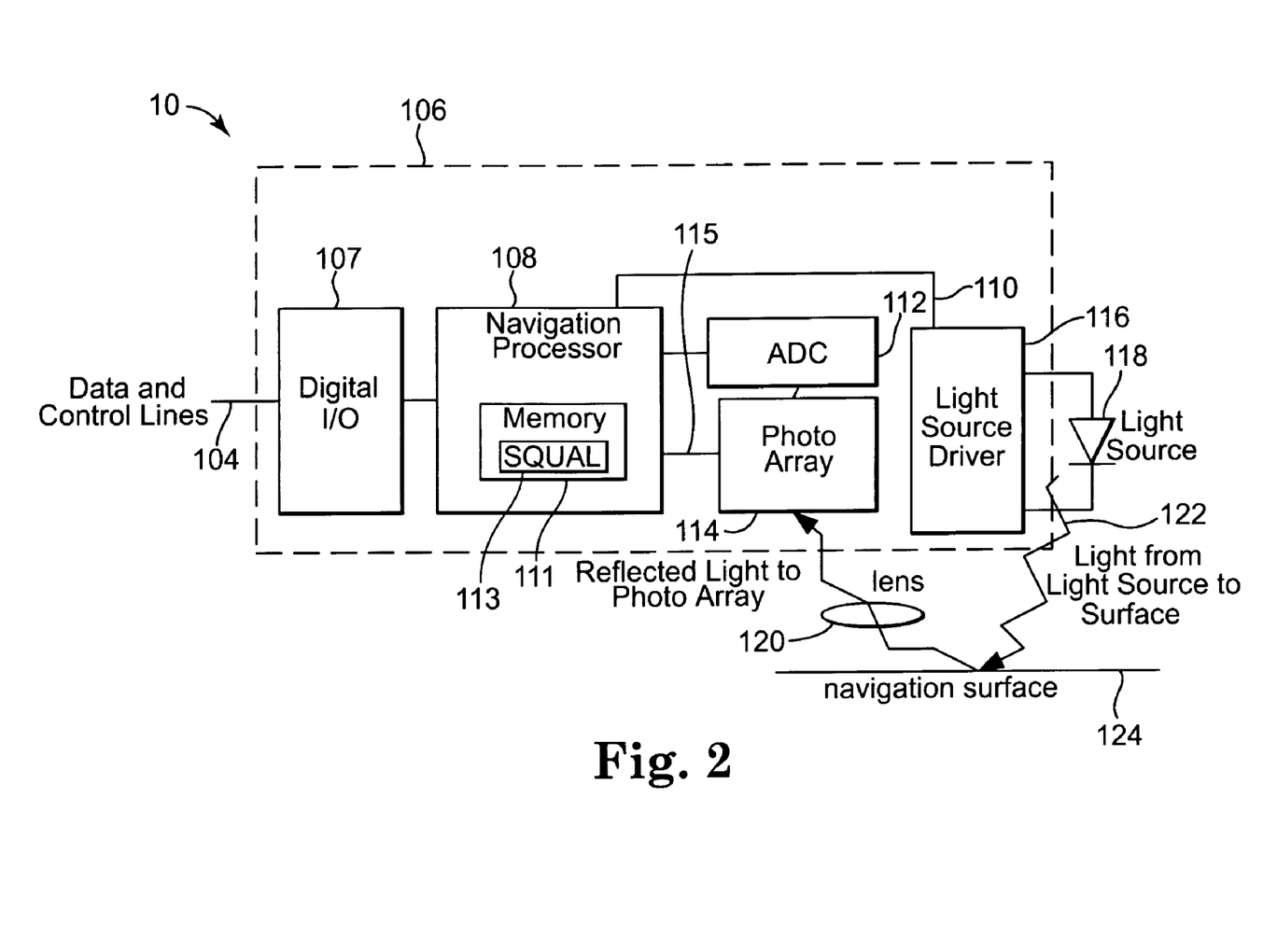
FIG. 2 is a block diagram illustrating major components of the optical pointing device shown in FIG. 1 according to one embodiment of the present invention.

FIG. 2 is a block diagram illustrating major components of optical pointing device 10 according to one embodiment of the present invention. Optical pointing device 10 includes optical navigation sensor 106, a light source 118, and a lens 120. Optical navigation sensor 106 includes digital input/output circuitry 107, a navigation processor 108, an analog to digital converter (ADC) 112, a photodetector array (photo array) 114, and a light source driver circuit 116. Navigation processor 108 includes a memory 111. In one embodiment, optical pointing device 10 is an optical mouse for a desktop personal computer, workstation, portable computer, or other device. In another embodiment, optical pointing device 10 is configured as an optical fingerprint motion sensing pointing device, or other pointing device. In another embodiment, the intensity of light source 118 is controlled.

In operation, according to one embodiment, light source 118 emits light 122 onto navigation surface 124, which is a desktop or other suitable imaging surface, and reflected images are generated. In one embodiment, light source 118 is a light emitting diode (LED). In other embodiments, light source 118 is a laser. Light source 118 is controlled by driver circuit 116, which is controlled by navigation processor 108 via control line 110. In one embodiment, control line 110 is used by navigation processor 108 to cause driver circuit 116 to be powered on and off, and correspondingly cause light source 118 to be powered on and off.

Reflected light from surface 124 is directed by lens 120 onto photodetector array 114. Each photodetector in photodetector array 114 provides a signal that varies in magnitude based upon the intensity of light incident on the photodetector. The signals from photodetector array 114 are output to analog to digital converter 112, which converts the signals into digital values of a suitable resolution (e.g., eight bits). The digital values represent a digital image or digital representation of the portion of the desktop or other navigation surface or imaging surface under optical pointing device 10. The digital values generated by analog to digital converter 112 are output to navigation processor 108. The digital values received by navigation processor 108 are stored as frames within memory 111.

The overall size of photodetector array 114 is preferably large enough to receive an image having several features. Images of such spatial features produce translated patterns of pixel information as optical pointing device 10 moves over navigation surface 124. The number of photodetectors in array 114 and the frame rate at which their contents are captured and digitized cooperate to influence how fast optical pointing device 10 can be moved across a surface and still be tracked. Tracking is accomplished by navigation processor 108 by comparing a newly captured sample frame with a previously captured reference frame to ascertain the direction and amount of movement.

In one embodiment, navigation processor 108 performs a cross-correlation of sequential frames to determine motion information. In one form of the invention, the entire content of one of the frames is shifted by navigation processor 108 by a distance of one pixel successively in each of the eight directions allowed by a one pixel offset trial shift (one over, one over and one down, one down, one up, one up and one over, one over in the other direction, etc.). That adds up to eight trials. Also, since there might not have been any motion, a ninth trial "null shift" is also used. After each trial shift, those portions of the frames that overlap each other can then be multiplied and summed by navigation processor 108 to form a measure of similarity (correlation) within that region of overlap. In another embodiment, larger trial shifts (e.g., two over and one down) may be used. The trial shift with the greatest correlation can be taken as an indication of the motion between the two frames. That is, it provides raw movement information that may be scaled and or accumulated to provide movement information ($\Delta X$ and $\Delta Y$) of a convenient granularity and at a suitable rate of information exchange, which is output to a host device by digital input/output circuitry 107 on data and control lines 104. Optical pointing device 10 is also configured to receive data and control signals from a host device via data and control lines 104.

In one embodiment, photodetector array 114 includes an electronic shutter for controlling the charge accumulation time of the photodetectors. When the electronic shutter is "open," charge is accumulated, creating voltages that are related to the intensity of light incident on the photodetectors in array 114. At the end of an integration time, the electronic shutter is "closed," and no further charge accumulates. In one form of the invention, navigation processor 108 is configured to control the charge accumulation time of photodetector array 114 via control line 115, to help ensure proper exposure, and to help ensure that successive images have a similar exposure. In one embodiment, navigation processor 108 checks the values of the captured digital image data and determines whether there are too many minimum values or too many maximum values. If there are too many minimum values, navigation processor 108 increases the charge accumulation time of photodetector array 114 via control line 115. If there are too many maximum values, navigation processor 108 decreases the charge accumulation time of photodetector array 114. In one embodiment, navigation processor 108 averages all of the pixels in each captured digital image, and adjusts the charge accumulation time of array 114 based on the calculated average values.

In one form of the invention, an image is captured and processed by optical navigation sensor 106 during a frame period. A frame period includes three phases—an integration phase, an analog to digital (A/D) conversion phase, and an image processing phase. During the integration phase, light is "collected" by photodetector array 114, and charge is accumulated. During the A/D conversion phase, the accumulated charge is converted into digital data by analog to digital converter 112. During the image processing phase, navigation processor 108 processes the digital image data and generates incremental $\Delta X$, $\Delta Y$ movement data, which is output to a host device. In one embodiment, during each frame period, navigation processor 108 causes light source 118 to turn on during the integration phase, and to turn off during the A/D conversion phase and the image processing phase.

In one embodiment, navigation processor 108 is configured to calculate surface quality (SQUAL) values 113, which are stored in memory 111. In one embodiment, navigation processor 108 examines each captured frame stored in memory 111, and identifies the number of surface features appearing in the frame. Navigation processor 108 stores a SQUAL value 113 for the current frame in memory 111. The stored SQUAL value 113 represents the identified number of surface features in the current frame. In one form of the invention, navigation processor 108 updates the SQUAL value 113 stored in memory 111 for each captured image frame. In one embodiment, each SQUAL value 113 is in the range of 0 to 255. In other embodiments SQUAL value 113 may be another measure of surface navigability.

Surface features according to one embodiment are defined to include patterns appearing in a captured image that are caused by the microscopic texture or roughness of the navigation surface 124, such as bright and dark regions in a captured image caused by ridges and valleys, or other imperfections or visible contrast features in the surface 124. If the optical pointing device 10 is lifted off of the navigation surface 124, such as a desk top, there will be little or no surface features appearing in the captured frames, and the SQUAL values 113 will approach zero. On an "easy-to-navigate" surface 124, and when the optical pointing device 10 is at an optimum distance from the surface 124, the SQUAL values 113 approach a maximum value. The higher the SQUAL value 113, the higher the quality of the surface 124 for the purpose of performing navigation computations.

In one embodiment, navigation processor 108 performs a navigation process, including cross-correlation of successive image frames and calculation of movement data, only if the current SQUAL value 113 is above a minimum threshold value. In one form of the invention, if the current SQUAL value 113 falls below the minimum threshold value, navigation processor 108 outputs zero values for the movement data, and stops the navigation process until the current SQUAL value 113 rises back above the minimum threshold value. When the SQUAL value 113 rises back above the minimum threshold value, navigation processor 108 resumes the navigation process. In one embodiment, navigation processor 108 is also configured to control the light source 118 based on the current SQUAL value 113. The use of the SQUAL values 113 by navigation processor 108 according to various embodiments of the present invention is described in further detail below with reference to FIGS. 4-6.

Optical pointing device 10 functions effectively within a range of heights above navigation surface 124. If the range of heights is exceeded, optical pointing device 10 may not adequately capture frames that allow navigation to be tracked. The range of heights above navigation surface 124 in which optical pointing device 10 functions effectively is referred to herein as the operation height of optical pointing device 10.

The operation height of optical pointing device 10 depends on navigation surface 124 (e.g., the regularity or evenness of navigation surface 124), manufacturing tolerances of optical navigation sensor 106, and the overall design of optical pointing device 10 including the design of housing 12. Because of these dependencies, the operation height of optical pointing device 10 may vary and may not be suited for the needs of a particular user. For example, a pointer controlled by optical pointing device 10 may undesirably continue to move if a user does not lift optical pointing device 10 above the operational height of optical pointing device 10 when attempting to reposition optical pointing device 10 on navigation surface 124. In this case, a user may wish to adjust the operational height of optical pointing device 10 to prevent a pointer from moving in response to optical pointing device 10 being lifted from navigation surface 124.

As another example, optical pointing device 10 may not adequately capture frames that allow navigation to be tracked if a user installs mouse feet or other components on housing 12 such that the mouse feet or other components cause the operation height of optical pointing device 10 with respect to navigation surface 124 to be exceeded. In this case, a user may wish to adjust the operational height of optical pointing device 10 to allow optical pointing device 10 to work properly with mouse feet or other components.

Figure 3A:
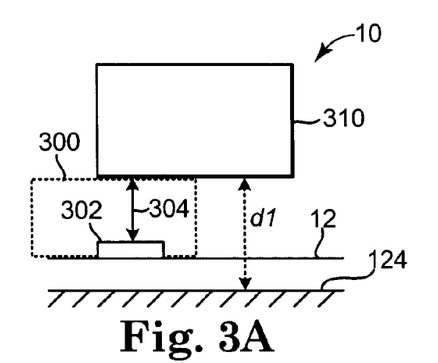
FIGS. 3A-3D are block diagrams illustrating adjusting the optical navigation sensor of the optical pointing device shown in FIGS. 1 and 2 according to one embodiment of the present invention.
Figure 3B:
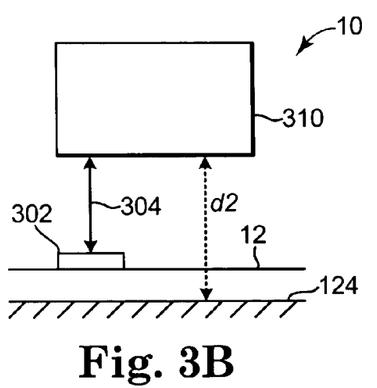
Figure 3C:
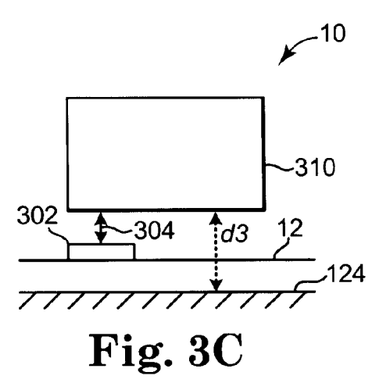
Figure 3D:
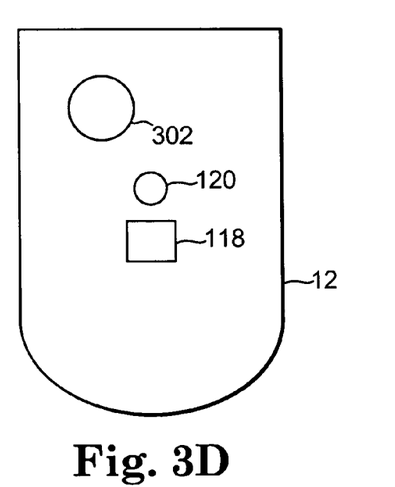
Figure 4:
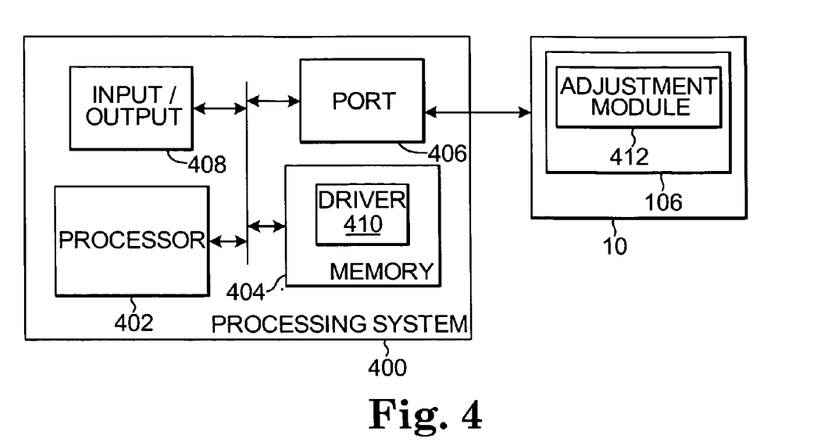
FIG. 4 is a block diagram illustrating a system for adjusting the optical navigation sensor of the optical pointing device shown in FIGS. 1 and 2 according to one embodiment of the present invention.
Figure 5:
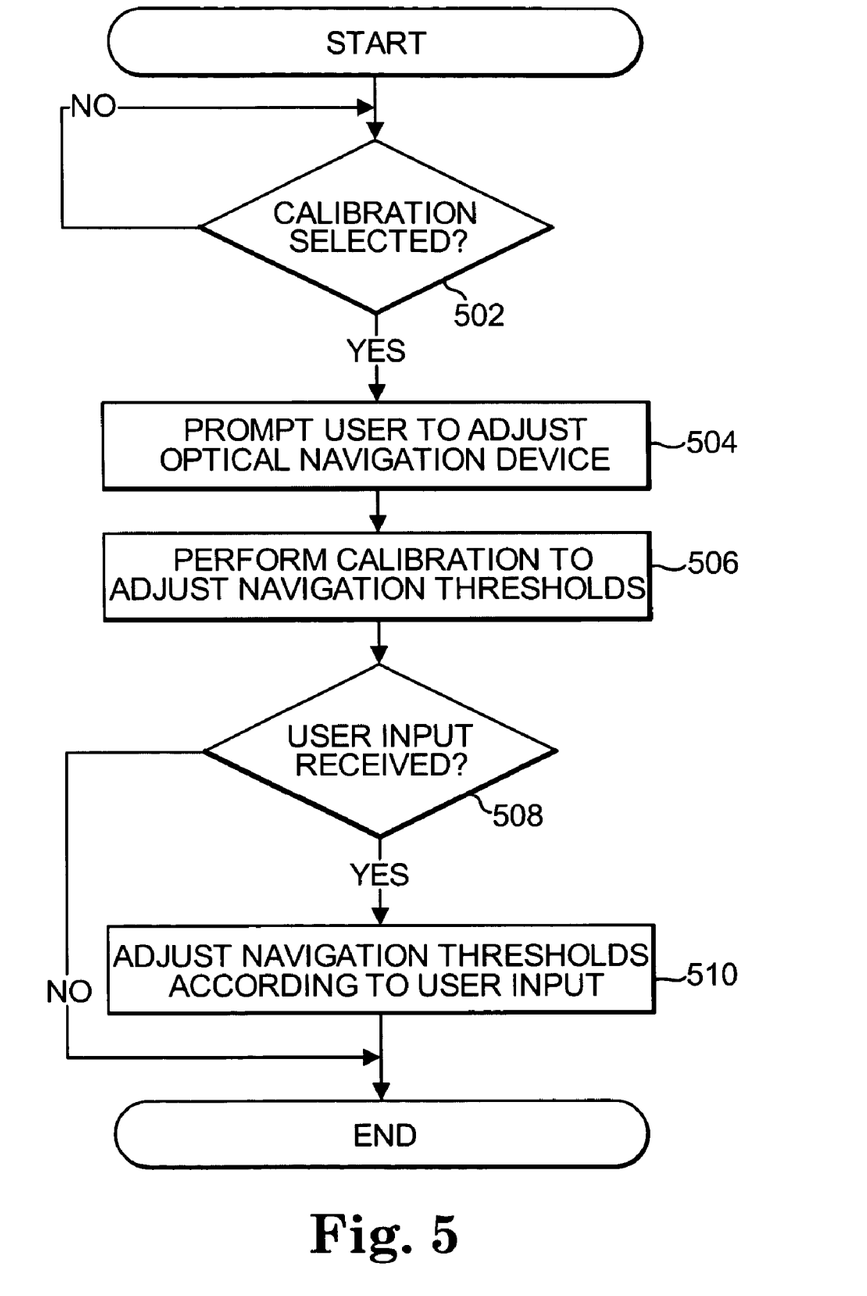
FIG. 5 is a flow chart illustrating a method for adjusting the optical navigation sensor of the optical pointing device shown in FIGS. 1 and 2 according to one embodiment of the present invention.

FIGS. 3A-3D, 4, and 5 illustrate embodiments that allow the operational height of optical pointing device 10 to be adjusted. In FIGS. 3A-3D, a user or manufacturer mechanically adjusts the operational height of optical pointing device 10 by adjusting the placement of optical navigation sensor 106, light source 118, and lens 120, referred to collectively as optical navigation system 310, in housing 12. In FIGS. 4 and 5, a user or manufacturer programmatically adjusts the operational height of optical pointing device 10 by adjusting operational parameters of optical navigation sensor 106.

FIGS. 3A-3D are block diagrams illustrating mechanically adjusting optical navigation system 310 of optical pointing device 10 according to one embodiment of the present invention. In the embodiment shown in FIGS. 3A-3D, optical pointing device 10 includes an adjustment module 300. Adjustment module 300 includes an adjustment mechanism 302 with a mechanical connection 304 to optical navigation system 310. Adjustment mechanism 302 is mounted on or recessed within case 12. Adjustment mechanism 302 may be any suitable mechanism for moving optical navigation system 310 using mechanical connection 304. For example, adjustment mechanism 302 may be a threaded adjustment ring or a slide bar.

A user adjusts adjustment mechanism 302 to move optical navigation system 310 relative to navigation surface 124. In FIG. 3A, optical navigation system 310 is at a first distance, d1, from navigation surface 124. A user may adjust adjustment mechanism 302 to increase the distance between optical navigation system 310 and navigation surface 124 as indicated in FIG. 3B where optical navigation system 310 is at a second distance, d2, that is greater than the first distance, d1, from navigation surface 124. A user may also adjust adjustment mechanism 302 to decrease the distance between optical navigation system 310 and navigation surface 124 as indicated in FIG. 3C where optical navigation system 310 is at a third distance, d3, that is less than the first distance, d1, from navigation surface 124.

As shown in FIGS. 3A-3D, adjustment mechanism 302 is recessed into the bottom of case 12 such that it is offset from light source 118 and lens 120. In other embodiments, adjustment mechanism 302 may be mounted or recessed in other locations (e.g., on or near the top or on or near a side of case 12).

FIG. 4 is a block diagram illustrating a system for programmatically adjusting the optical navigation sensor of the optical pointing device shown in FIGS. 1 and 2 according to one embodiment of the present invention. In FIG. 4, a processing system 400 is operatively coupled to optical pointing device 10 through a wired or wireless connection using port 406. Processing system 400 includes a processor 402 configured to execute programs in a memory 404. The programs include a driver 410 associated with optical pointing device 10. Driver 410 may be stored on any other portable or non-portable storage medium prior to being stored in memory 404. A user interacts with driver 410 using optical pointing device 10 and one or more input/output devices 408 such as a keyboard and a display device. Optical navigation sensor 106 includes an adjustment module 412.

Using processing system 400, a user or manufacturer interacts with driver 410 to provide parameters to cause the operation height of optical navigation sensor 106 to be adjusted using adjustment module 412. Driver 410 receives the parameters from the user or manufacturer and causes the parameters to be provided to adjustment module 412. Driver 410 may cause information such as a graph or gauge to be displayed or otherwise provided to the user in the process of the user adjusting the operation height of optical navigation sensor 106 to assist the user in performing the adjustment. Adjustment module 412 includes a portion of memory 111 such as a registers (not shown) such that adjustment module 412 is accessible by navigation processor 108.

In one embodiment, the parameters adjusted by the user or manufacturer include a threshold associated with SQUAL 113 and a navigation limit parameter. Optical navigation sensor 106 uses the threshold associated with SQUAL 113 and the navigation limit parameter to determine the conditions under which optical navigation sensor 106 stops generating and providing movement information to cause a pointer controlled by optical pointing device 10 to freeze, i.e., stop moving.

In another embodiment, a user or manufacturer selects a calibration function provided by driver 410 to cause optical navigation sensor 106 to optimize the function of optical pointing device 10 for a particular navigation surface 124. FIG. 5 is a flow chart illustrating a method for programmatically adjusting optical navigation sensor 106 of optical pointing device 10 according to one embodiment of the present invention. The method of FIG. 5 may be implemented by driver 410 in response to being executed by processor 402.

In FIG. 5, a determination is made as to whether a calibration of optical navigation sensor 10 has been selected by a user or manufacturer as indicated in a block 502. If a calibration of optical navigation sensor 10 has not been selected, then the function of block 502 may be performed at a later time.

If a calibration of optical navigation sensor 10 has been selected by the user, then driver 410 prompts the user or manufacturer to adjust optical navigation sensor 10 as indicated in a block 504. In one embodiment, driver 410 prompts the user or manufacturer to move optical navigation sensor 10 to generate adjustment data. In another embodiment, driver 410 prompts the user or manufacturer to adjust a scroll wheel (not shown) of optical navigation sensor 10 to generate the adjustment data. Driver 410 detects the adjustment data and other information output by optical navigation sensor 10 and uses the adjustment data and other information to perform a calibration of optical navigation sensor 106 to adjust navigation thresholds as indicated in a block 506. The navigation thresholds may include a threshold associated with SQUAL 113 and a navigation limit parameter.

A determination is made as to whether driver 410 receives a user input associated with the calibration as indicated in a block 508. The user input may include additional adjustments of optical pointing device 10 provided by a user or manufacturer of optical pointing device 10 to more closely adjust the operational height of optical pointing device 10. If driver 410 receives a user input associated with the calibration, then driver 410 adjusts the navigation thresholds according to the user input as indicated in a block 510.

Using the embodiments of FIGS. 4 and 5, a user or manufacturer may cause driver 410 to store navigation parameters associated with different navigation surfaces 124. Accordingly, a user or manufacturer may use the stored parameters to choose between different navigation surfaces 124 for optical pointing device 10. A user or manufacturer may also use the stored parameters to allow for different optical pointing devices 10 for a particular processing system 400.

In a conventional or standard mode of operation, optical navigation sensor 106 outputs movement information to essentially freeze, i.e., stop the movement of, a pointer controlled by optical pointing device 10 in response to a user lifting optical pointing device 10 from navigation surface 124 beyond the operational height of optical pointing device 10. For example, a cursor in a display device may be frozen in response to a user lifting optical pointing device 10 from navigation surface 124 in accordance with the output information provided by optical navigation sensor 106.

Figure 6:
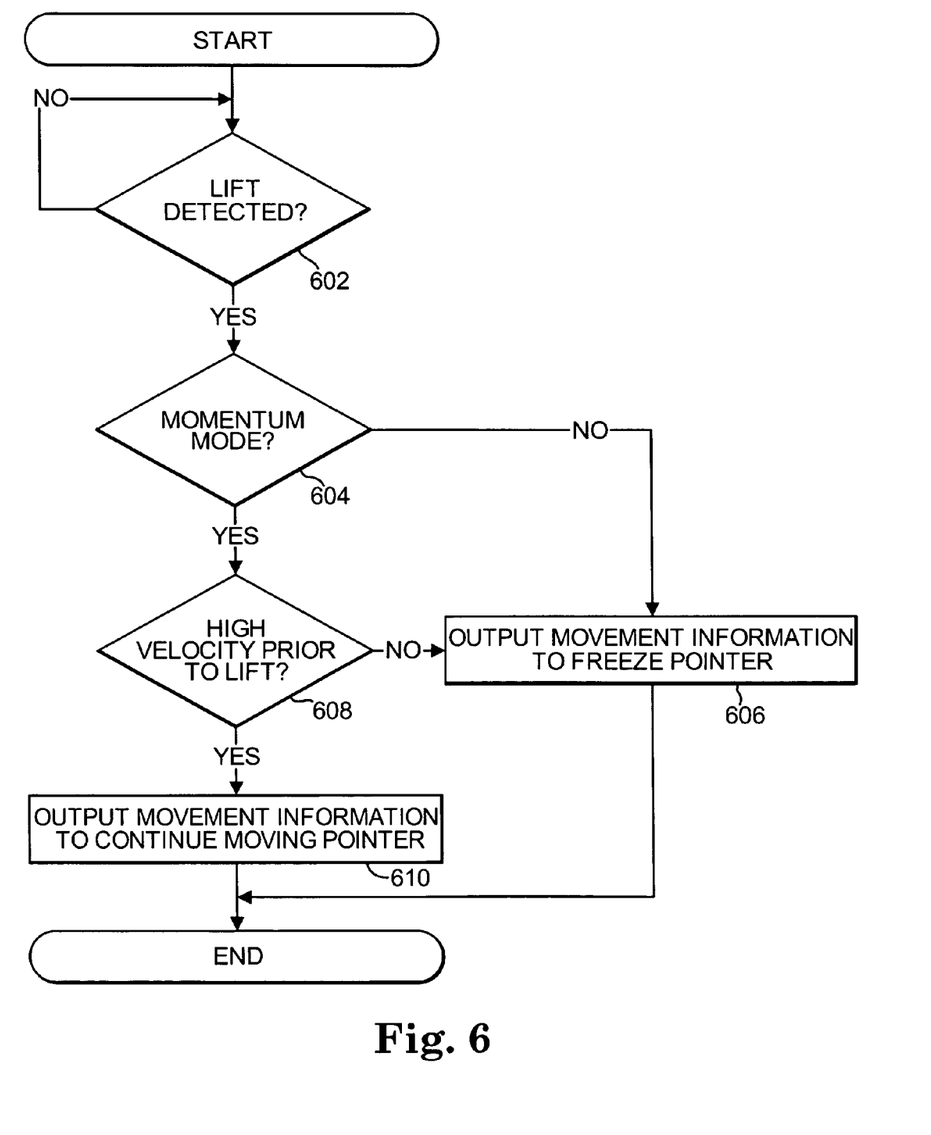
FIG. 6 is a flow chart illustrating a method for implementing a momentum mode of the optical navigation sensor of the optical pointing device shown in FIGS. 1 and 2 according to one embodiment of the present invention.

In a momentum mode of operation, a pointer controlled by optical pointing device 10 continues to move for a predefined time period in response to the user lifting optical pointing device 10 from navigation surface 124 beyond the operational height of optical pointing device 10 if the velocity of the pointer prior to the lift is above a threshold. FIG. 6 is a flow chart illustrating a method for implementing a momentum mode of the optical navigation sensor of optical pointing device 10 according to one embodiment of the present invention. The method of FIG. 6 may be implemented by optical navigation sensor 106 using navigation processor 108.

In FIG. 6, a determination is made as to whether a lift is detected as indicated in a block 602. A lift may involve a lift of optical navigation device 10 from navigation surface 124 or a lift of a navigation surface such as a finger from optical navigation sensor 106. In one embodiment, optical navigation sensor detects a lift of optical pointing device 10 by detecting that SQUAL value 113 is below a threshold value. In other embodiments, optical navigation sensor detects a lift of optical pointing device 10 in other ways. If a lift of optical pointing device 10 is not detected, then the function of block 602 is repeated at a later time.

If a lift is detected, then a determination is made by optical navigation sensor 106 as to whether it is in a momentum mode of operation as indicated in a block 604. Optical navigation sensor 106 determines whether it is in a momentum mode of operation by accessing information stored in memory 111 that indicates whether optical navigation sensor is in a conventional or momentum mode of operation.

Figure 7A:
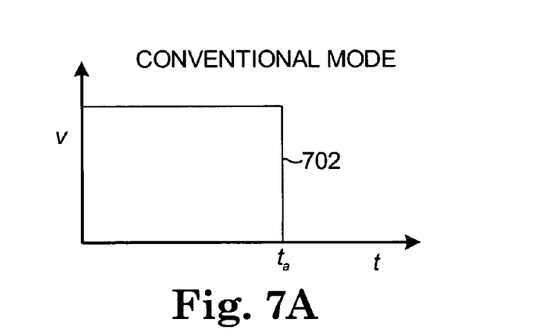
FIG. 7A is a graph illustrating a conventional mode of the optical navigation sensor of the optical pointing device shown in FIGS. 1 and 2 according to one embodiment of the present invention.

If optical navigation sensor 106 is not in a momentum mode of operation (i.e., optical navigation sensor 106 is in a conventional or standard mode of operation), then optical navigation sensor 106 outputs movement information to freeze a pointer as indicated in a block 606. FIG. 7A is a graph illustrating a conventional mode of optical navigation sensor 106 of optical pointing device 10 according to one embodiment of the present invention. Graph 702 in FIG. 7A shows the velocity (v) of a pointer controlled by optical pointing device 10 over time (t). Prior to a time $t_a$, optical navigation sensor 106 outputs movement information to move the pointer controlled by optical pointing device 10 at the velocity indicated by graph 702. At time $t_a$, optical navigation sensor 106 detects that the user has lifted optical pointing device 10. As a result, optical navigation sensor 106 outputs movement information to cause the velocity of the pointer to go to zero, i.e., freeze the pointer. In the conventional mode of operation, optical navigation sensor 106 outputs movement information to freeze the pointer irrespective of the velocity of the pointer prior to the lift.

If optical navigation sensor 106 is in a momentum mode of operation as determined in block 604, then a determination is made by optical navigation sensor 106 as to whether a high velocity of optical pointing device 10 is detected prior to the lift as indicated in a block 608. Optical navigation sensor 106 detects a high velocity of optical pointing device 10 if the velocity of optical pointing device 10 prior to the lift exceeds a threshold. Optical navigation sensor 106 calculates the velocity based on movement information detected prior to the lift. The velocity may be an average velocity over a time period prior the lift or a velocity at a predetermined time prior to the lift.

If a high velocity of optical pointing device 10 is not detected, then optical navigation sensor 106 outputs movement information to freeze a pointer controlled by optical pointing device 10 as indicated in block 606. With a velocity below the threshold, optical navigation sensor 106 operates similarly to the conventional mode by freezing the pointer.

If a high velocity of optical pointing device 10 is detected, then optical navigation sensor 106 outputs movement information to continue moving a pointer controlled by optical pointing device 10 as indicated in a block 610. Optical navigation sensor 106 outputs movement information to continue moving the pointer according to predefined momentum parameters. The momentum parameters define a function with which optical navigation sensor 106 continues to move the pointer after the lift. The function may be an exponential or linear function, for example, that identifies the velocity, direction, and distance that the pointer moves after the lift.

Figure 7B:
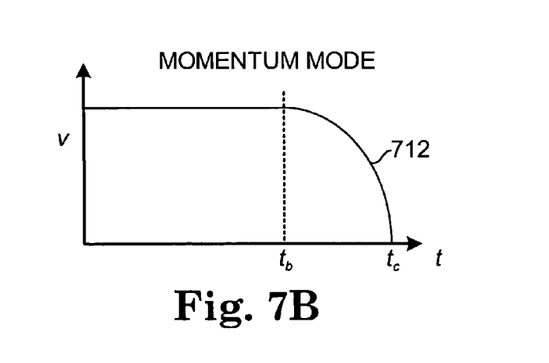
FIG. 7B is a graph illustrating a momentum mode of the optical navigation sensor of the optical pointing device shown in FIGS. 1 and 2 according to one embodiment of the present invention.

FIG. 7B is a graph illustrating a momentum mode of optical navigation sensor 106 of optical pointing device 10 according to one embodiment of the present invention. Graph 712 in FIG. 7B shows the velocity (v) of a pointer controlled by optical pointing device 10 over time (t). Prior to a time $t_b$, optical navigation sensor 106 outputs movement information to move the pointer controlled by optical pointing device 10 at the velocity indicated by graph 712. At time $t_b$, optical navigation sensor 106 detects that the user has lifted optical pointing device 10. As a result, optical navigation sensor 106 outputs movement information to cause the velocity of the pointer to go to zero over a time period between time $t_b$ and a time $t_c$. During the time period between time $t_b$ and a time $t_c$, optical navigation sensor 106 outputs movement information to cause the velocity of the pointer to gradually decrease until the velocity reaches zero at time $t_c$.

In one embodiment, the momentum parameters are programmable to "skate" the pointer after a lift in momentum mode. A "skate" occurs where the pointer continuously slows (e.g., by following a linear or exponential velocity decay function) after the lift for a time period until the velocity reaches zero and the pointer stops.

In another embodiment, the momentum parameters are programmable to "throw" the pointer after a lift in momentum mode. A "throw" occurs where the pointer continues at a continuous or accelerating velocity during the lift until the pointer reaches a maximum location, e.g., the edge of a display device or the boundary of an area within display device.

After a user returns optical pointing device 10 to navigation surface 124, optical pointing device 10 returns to normal operation to output movement information based on the frames detected by optical navigation sensor 106 according to one embodiment.

The momentum parameters used by optical navigation sensor 106 may be programmed by a user or manufacturer of optical pointing device 10 using the embodiment shown in FIG. 4. The user or manufacturer interacts with driver 410 using input/output devices 408 to provide the momentum parameters. Driver 410 causes the momentum parameters to be provided to optical pointing device 10 and stored in memory 111. The user or manufacturer may specify time, distance, or velocity momentum parameters to customize optical navigation sensor 106 for a particular purpose, e.g., for a particular computer game. In addition, the threshold velocity used in block 608 may be programmed by a user or manufacturer. If desired, the user or manufacturer may set the threshold velocity to a low value, e.g., zero, to cause optical navigation sensor 106 to output movement information to continue moving a pointer any time a lift occurs.

Functions performed by optical navigation sensor 106 may be implemented in hardware, software, firmware, or any combination thereof. The implementation may be via a microprocessor, programmable logic device, or state machine. Components of the present invention may reside in software on one or more computer-readable mediums. The term computer-readable medium as used herein is defined to include any kind of memory, volatile or non-volatile, such as floppy disks, hard disks, CD-ROMs, flash memory, read-only memory (ROM), and random access memory.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An optical pointing device comprising:
an optical navigation system;
a housing that includes the optical navigation system; and
an adjustment module coupled to the housing to adjust an operational height of the optical navigation system, the adjustment module comprising:
an adjustment mechanism coupled to the housing; and
a mechanical connection connected to the adjustment mechanism and the optical navigation system,
wherein the adjustment mechanism is configured to raise and lower the optical navigation system relative to a navigation surface using the mechanical connection to increase and decrease the distance between the optional navigation system and the navigation surface so that the operational height of the optical navigation system is adjusted.

2. The optical pointing device of claim 1 wherein the adjustment module includes at least one navigation parameter.

3. The optical pointing device of claim 2 wherein the navigation parameter is received by the optical navigation system from a processing system.

4. The optical pointing device of claim 2 wherein the navigation parameter is associated with a measure of surface navigability.

5. The optical pointing device of claim 1, further comprising:
an optical navigation sensor contained in the housing,
wherein the optical navigation sensor is configured to provide movement information to a processing system to cause a pointer to continue moving in response to detecting that the housing has been lifted from the navigation surface only if a determination is made that a velocity of the optical pointing device prior to the detecting that the housing has been lifted exceeds a threshold, the optical navigation sensor being further configured to provide the movement information to the processing system to cause the pointer to freeze in response to detecting that the housing has been lifted from the navigation surface only if a determination is made that the velocity of the optical pointing device prior to the detecting that the housing has been lifted does not exceed the threshold wherein the optical navigation sensor is configured to provide the movement information to the processing system to cause the pointer to continue moving according to at least one parameter input by a user.

6. A method performed by an optical navigation sensor in an optical pointing device, the method comprising:
receiving a navigation parameter; and
adjusting an operational height of the optical pointing device using the navigation parameter, wherein the operational height is a range of heights above a navigation surface in which the optical pointing device can function, the adjusting of the operational height including adjusting a threshold for surface quality values, each of the surface quality values corresponding to a number of surface features identified in a captured frame by the optical navigation sensor.

7. The method of claim 6 comprising:
receiving the navigational parameter from a user.

8. The method of claim 6 further comprising:
increasing the operational height of the optical pointing device using the navigation parameter.

9. The method of claim 6 further comprising:
decreasing the operational height of the optical pointing device using the navigation parameter.

10. The method of claim 6, further comprising:
detecting a lift between the optical pointing device that includes the optical navigation sensor and the navigation surface;
determining whether a velocity of the optical pointing device prior to the lift exceeds a velocity threshold;
providing movement information to a processing system to cause a pointer to continue moving in response to detecting the lift only if the velocity exceeds the threshold; and
providing the movement information to the processing system to cause the pointer to freeze in response to detecting the lift only if the velocity does not exceed the velocity threshold.

11. A non-transitory computer readable medium comprising a program executable by a processing system for causing the processing system to:
receive a calibration selection from a user;
prompt the user to adjust an optical navigation device coupled to the processing system;
perform a calibration to generate at least one navigation parameter configured to adjust an operation height of the optical navigation device, wherein the operational height is a range of heights above a navigation surface in which the optical pointing device can function, the at least one navigation parameter including a threshold for surface quality values, each of the surface quality values corresponding to a number of surface features identified in a captured frame by the optical navigation sensor; and
provide the navigation parameter to the optical navigation device.

12. The non-transitory computer readable medium of claim 11 wherein the program is executable by the processing system for causing the processing system to:
receive a user input associated with the navigation parameter; and adjust the navigation parameter prior to providing the navigation parameter to the optical navigation device.

13. The non-transitory computer readable medium of claim 11 wherein the navigation parameter is configured to adjust the operational height of the optical pointing device.

14. The non-transitory computer readable medium of claim 13 wherein the navigation parameter is configured to increase the operational height of the optical pointing device.

15. The non-transitory computer readable medium of claim 13 wherein the navigation parameter is configured to decrease the operational height of the optical pointing device.

16. A method performed by an optical navigation sensor, the method comprising:
    detecting a lift between an optical pointing device that includes the optical navigation sensor and a navigation surface;
    determining whether a velocity of the optical pointing device prior to the lift exceeds a threshold;
    providing movement information to a processing system to cause a pointer to continue moving in response to detecting the lift only if the velocity exceeds the threshold; and
    providing the movement information to the processing system to cause the pointer to freeze in response to detecting the lift only if the velocity does not exceed the threshold.

17. The method of claim 16 further comprising:
    providing the movement information to the processing system to cause the pointer to continue moving according to a linear decay function.

18. The method of claim 16 further comprising:
    providing the movement information to the processing system to cause the pointer to continue moving according to an exponential decay function.

19. The method of claim 16 further comprising:
    providing the movement information to the processing system to cause the pointer to continue moving during the lift.

20. The method of claim 16 further comprising:
    providing the movement information to the processing system to cause the pointer to continue moving according to at least one parameter input by a user.

21. An optical pointing device comprising:
    a housing; and
    an optical navigation sensor contained in the housing;
    wherein the optical navigation sensor is configured to provide movement information to a processing system to cause a pointer to continue moving in response to detecting that the housing has been lifted from a navigation surface only if a determination is made that a velocity of the optical pointing device prior to the detecting that the housing has been lifted exceeds a threshold, the optical navigation sensor being further configured to provide the movement information to the processing system to cause the pointer to freeze in response to detecting that the housing has been lifted from the navigation surface only if a determination is made that the velocity of the optical pointing device prior to the detecting that the housing has been lifted does not exceed the threshold.

22. The optical pointing device of claim 21 wherein the optical navigation sensor is configured to provide the movement information to the processing system to cause the pointer to continue moving according to a function of time.

23. The optical pointing device of claim 21 wherein the optical navigation sensor is configured to provide the movement information to the processing system to cause the pointer to continue moving while the optical pointing device is lifted.

24. The optical pointing device of claim 21 wherein the optical navigation sensor is configured to provide the movement information to the processing system to cause the pointer to continue moving according to at least one parameter input by a user.

* * * * *